United States Patent
Schmidt

(10) Patent No.: US 10,891,125 B2
(45) Date of Patent: Jan. 12, 2021

(54) VIDEOGAME PATCH DATA COMPILATION SYSTEM

(71) Applicant: Electronic Arts Inc., Redwood City, CA (US)

(72) Inventor: Kurtis Michael Schmidt, Port Moody (CA)

(73) Assignee: Electronic Arts Inc., Redwood City, CA (US)

( * ) Notice: Subject to any disclaimer, the term of this patent is extended or adjusted under 35 U.S.C. 154(b) by 0 days.

(21) Appl. No.: 16/368,179

(22) Filed: Mar. 28, 2019

(65) Prior Publication Data

US 2020/0310783 A1    Oct. 1, 2020

(51) Int. Cl.
- *G06F 8/656* (2018.01)
- *A63F 13/77* (2014.01)
- *G06F 8/71* (2018.01)

(52) U.S. Cl.
CPC .............. *G06F 8/656* (2018.02); *A63F 13/77* (2014.09); *G06F 8/71* (2013.01); *A63F 2300/209* (2013.01)

(58) Field of Classification Search
CPC ................................ G06F 8/656; A63F 13/77
USPC .................................................. 717/168–178
See application file for complete search history.

(56) References Cited

U.S. PATENT DOCUMENTS

| | | | | |
|---|---|---|---|---|
| 9,352,227 B2 * | 5/2016 | Gatto | ........................ | A63F 13/12 |
| 10,545,855 B1 * | 1/2020 | Jayaswal | ................. | G06F 11/34 |
| 2006/0080702 A1 * | 4/2006 | Diez | ........................ | A63F 13/12 725/30 |
| 2010/0095290 A1 * | 4/2010 | Miwa | ........................ | G06F 8/65 717/170 |
| 2010/0240449 A1 * | 9/2010 | Corem | ..................... | A63F 13/12 463/29 |

OTHER PUBLICATIONS

Hsiao, Tsun-Yu, and Shyan-Ming Yuan. "Practical middleware for massively multiplayer online games." IEEE Internet Computing 9.5 (2005): pp. 47-54. (Year: 2005).*

Abdelkhalek, Ahmed, and Angelos Bilas. "Parallelization and performance of interactive multiplayer game servers." 18th International Parallel and Distributed Processing Symposium, 2004. Proceedings . . . IEEE, 2004.pp. 1-10 (Year: 2004).*

Mizrahi, Tal, and Yoram Moses. "Software defined networks: Its about time." IEEE INFOCOM 2016—The 35th Annual IEEE International Conference on Computer Communications. IEEE, 2016.pp. 1-9 (Year: 2016).*

(Continued)

*Primary Examiner* — Satish Rampuria

(74) *Attorney, Agent, or Firm* — Knobbe, Martens, Olson & Bear, LLP

(57) ABSTRACT

The present disclosure provides a system and method for updating a game application during runtime of a game application. The game application is executed on a client computing device using application code that includes a function store. During runtime of the game application, a function asset is received and stored in the function store. The function asset includes either precompiled code or code written in a scripting language and includes a version identifier. To execute a particular game function of the game application, the function asset is identified from other function assets in the function store based at least in part on its version identifier, and the game function is executed using the function asset.

19 Claims, 7 Drawing Sheets

(56) References Cited

OTHER PUBLICATIONS

Aarhus, Lars, Knut Holmqvist, and Martin Kirkengen. "Generalized two-tier relevance filtering of computer game update events." Proceedings of the 1st workshop on Network and system support for games. 2002.pp. 10-13 (Year: 2002).*

Sudarmilah, Endah, et al. "Tech review: Game platform for upgrading counting ability on preschool children." 2013 International Conference on Information Technology and Electrical Engineering (ICITEE). IEEE, 2013.pp. 226-231 (Year: 2013).*

Zhang, Aijun, and Yujia Ge. "The research on the application of game in online education." 2011 International Conference on Multimedia Technology. IEEE, 2011.pp. 5181-5184 (Year: 2011).*

* cited by examiner

VIDEOGAME PATCH DATA COMPILATION SYSTEM

BACKGROUND

Computing devices often run applications, such as mobile apps, that are downloaded from an application marketplace or remote server. The applications typically include precompiled machine code that configures one or more processors on a computing device to perform the tasks associated with the application. From time to time, app providers update their applications. One of the functions of an application marketplace provider is to review the applications before they are downloadable from the application marketplace. Typically, an app provider may be required to submit an app update to the application marketplace provider for review. Once the update is approved, it may be made available to users through the application marketplace.

Delivering updates as quickly to the user as possible can improve the user experience by continuously adding new features and fixing bugs. As such, because the review process increases the time to deliver the update to customers, a difficulty associated with an application marketplace is the frequency at which updates can be delivered. Submitting changes through the review process also consumes resources, as there is a cost associated with each submission. Additionally, users generally dislike updating apps and, generally, delay upgrades until absolutely necessary.

SUMMARY OF EMBODIMENTS

The systems, methods, and devices of this disclosure each have several innovative aspects, no single one of which is solely responsible for the all of the desirable attributes disclosed herein.

The present disclosure describes example systems, methods, and for executing a game application. One or more embodiments disclose a method for executing a game application on a client computing device by one or more processors configured with computer-readable instructions. The method can include executing a game application on a client computing device using compiled application code. The compiled application code includes at least a function store that includes one or more function assets. The method further can further include executing at least a first game function within the game application. Executing the first game function can include identifying a first function asset from the one or more function assets of the function store based, at least in part, on a version identifier of the first function asset, wherein the first function asset is compiled machine code, and executing at least the first game function using the first function asset. The method can further include, during runtime of the game application, receiving a data packet over a network. The data packet can include at least a second function asset. The second function asset can include a second version identifier and is code in a scripting language. The method can further include, during runtime of the game application, updating the function store to include the second function asset as one of the one or more function assets of the function store. The method can further include, during runtime of the game application, executing at least the first game function within the game application. Executing the first game function can include identifying the second function asset from the one or more function assets of the function store based, at least in part, on a version identifier of the second function asset, and executing at least the first game function using the second function asset.

One or more embodiments disclose a method for executing a game application on a client computing device by one or more processors configured with computer-readable instructions. The method can include executing a game application on the client computing device using application code comprising a function store. The function store can include one or more function assets. The one or more function assets can include at least a first function asset associated with a first game function. The first function asset can include a first version identifier. The method can further include, during runtime of the game application, receiving, over a network, a data packet that includes a second function asset that is associated with the first game function. The second function asset can include a second version identifier. The method can further include, during runtime of the game application, updating the function store to include the second function asset as one of the one or more function assets of the function store. The method can further include, during runtime of the game application, executing the first game function. Executing the first game function can include selecting the second function asset instead of the first function asset based, at least in part, on the second version identifier, and executing the first game function using the second function asset.

The method of any of the preceding paragraphs may also include any combination of the following features or steps described in this paragraph, among others described herein. The method can include prior to said receiving the data packet, executing the first game function using the first function asset based, at least in part, on the first version identifier. Said selecting the second function asset instead of the first function asset can include comparing the first version identifier with the second version identifier, and identifying the second version identifier based, at least in part, on a determination that the second version identifier corresponds to a newer version identifier than does the first version identifier. One or both of the first function asset or the second function asset can include a game function identifier associated with the first game function. The method can include identifying at least one of the first function asset or the second function asset from other function assets in the function store based, at least in part, on the game function identifier of the at least one of the first function asset or the second function asset.

The method of any of the preceding paragraphs may also include any combination of the following features or steps described in this paragraph, among others described herein. Said identifying the at least one of the first function asset or the second function asset can include identifying, for each of the one or more function assets of the function store, an associated game function identifier; and selecting the at least one of the first function asset or the second function asset based at least in part on a determination that the game function identifier of the at least one of the first function asset or the second function asset corresponds to the first game function. The application code can include compiled application code. The second function asset can include code in a scripting language. The first function asset can include compiled machine code. The second function asset can include non-compiled code.

One or more embodiments disclose a method for updating a game application on a client computing. The method can include receiving an indication of a client computing device executing a game application. The client computing device can execute the game application using application code that includes a function store. The function store can include one or more function assets. The one or more function assets can include at least a first function asset associated with a first game function. The first function asset can include a first version identifier. The method can further include, during runtime of the game application, communicating, over a network, a data packet to the client computing device. The data packet can include a second function asset that is associated with the first game function and includes a second version identifier. During the runtime of the game application and without recompiling the game application, the client computing device can update the function store to include the second function asset as one of the one or more function assets of the function store. Further, the client can select the second function asset instead of the first function asset based at least in part on the second version identifier and can execute the first game function using the second function asset.

The method of any of the preceding paragraphs may also include any combination of the following features or steps described in this paragraph, among others described herein. The indication of the client computing device executing the game application can include a data packet. The first function asset can be compiled application code. The second function asset can be code in a scripting language. The second function asset can be un-compiled code.

The present disclosure also provides an example user computing system. The user computing system can include one or more non-transitory, computer-readable storage mediums and one or more processors. The one or more non-transitory, computer-readable storage mediums can store computer readable instructions. The computer reading instructions can include at least application code for executing a game application. The application code can include a function store that includes one or more function assets. The one or more function assets can include at least a first function asset. The first function asset can be associated with a first game function and can include a first version identifier. The one or more processors can be configured to execute the computer readable instructions to perform operations. The operations can include executing the game application using the application code. The operations can include, during runtime of the game application, updating the function store to include a second function asset as one of the one or more function assets of the function store. The second function asset can be associated with the first game function and can include a second version identifier. The operations can include, during runtime of the game application, executing the first game function. Said executing the first game function can include selecting the second function asset instead of the first function asset based, at least in part, on the second version identifier, and executing the first game function using the second function asset.

The example user computing system of the preceding paragraph may also include any combination of the following features described in this paragraph, among others described herein. The operations can include, prior to said updating the function store to include the second function asset, executing the first game function using the first function asset based, at least in part, on the first version identifier. Said selecting the second function asset instead of the first function asset can include comparing the first version identifier with the second version identifier, and identifying the second version identifier based, at least in part, on a determination that the second version identifier corresponds to a newer version identifier than does the first version identifier. One or both of the first function asset or the second function asset can include a game function identifier associated with the first game function. The operations can include identifying at least one of the first function asset or the second function asset from other function assets in the function store based, at least in part, on the game function identifier of the at least one of the first function asset or the second function asset.

The example user computing system of any of the two preceding paragraphs may also include any combination of the following features described in this paragraph, among others described herein. Said identifying the at least one of the first function asset or the second function asset can include identifying, for each of the one or more function assets of the function store, an associated game function identifier, and selecting the at least one of the first function asset or the second function asset based at least in part on a determination that the game function identifier of the at least one of the first function asset or the second function asset corresponds to the first game function. The application code can include compiled application code. The second function asset can include code in a scripting language. The first function asset can include compiled machine code. The second function asset can include non-compiled code. The first function asset can include non-compiled code. The second function asset can include compiled machine code.

The example user computing system of any of the three preceding paragraphs may also include any combination of the following features described in this paragraph, among others described herein. The operations can include, during runtime of the game application, updating the function store to include a third function asset as one of the one or more function assets of the function store. The third function asset can be associated with the first game function and can include a third version identifier. The operations can include, during runtime of the game application, selecting the third function asset instead of the second function asset based, at least in part, on the third version identifier, and executing the first game function using the third function asset. The third function code can include compiled machine code. The second function asset can include non-compiled code.

Although certain embodiments and examples are disclosed herein, inventive subject matter extends beyond the examples in the specifically disclosed embodiments to other alternative embodiments and/or uses, and to modifications and equivalents thereof.

BRIEF DESCRIPTION OF THE DRAWINGS

Throughout the drawings, reference numbers are re-used to indicate correspondence between referenced elements. The drawings are provided to illustrate embodiments of the subject matter described herein and not to limit the scope thereof.

DETAILED DESCRIPTION OF EMBODIMENTS

Overview

Figure 1:
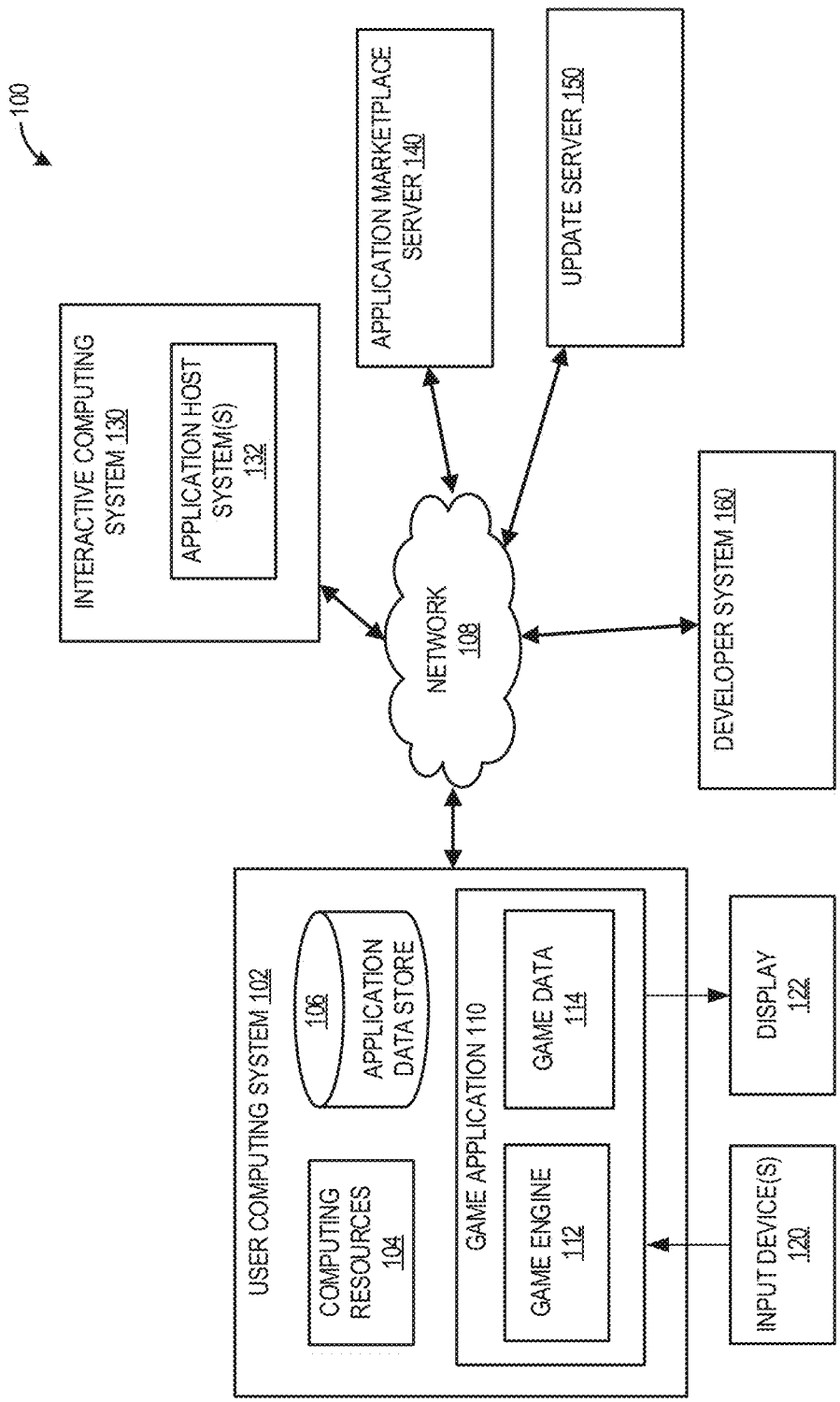
FIG. 1 illustrates an embodiment of a computing environment 100 for implementing a videogame patch.

Quickly delivering updates to an application, such as a game application, on a user's computing device can improve the user's experience. However, the required review process for updates to precompiled machine code increases the time and cost to deliver the update. One solution to quickly deliver updates and avoid the required review process is to use an interpreted scripting language, rather than precompiled machine code. The interpreted scripting language can be deployed directly to customers without prior review and approval by the application marketplace provider during runtime of the application. However, interpreted scripting language can be slower than precompiled machine code, which can limit the quantity of scripting language used in an application.

Embodiments of the disclosed technology utilize both precompiled machine code and interpreted script logic to facilitate rapid distribution of updates, while retaining the speed, quality, and content of the application. In order to accomplish this, a particular application can be distributed in phases. For example, when the application is first distributed, it is in precompiled machine code, which can ensure that the application runs as fast as possible. Subsequently, should bugs be found in the original precompiled machine code or should other updates to the original precompiled machine code be desired, the bug fixes or new features can be implemented using scripted logic. This scripted logic can be rapidly distributed to the user's computing device as a data update, and, during runtime of the application, the application can detect that the newer script-based version of a function is available and begin using it.

As described above, interpreted scripting language can be orders of magnitude slower than compiled code. As such, over time, and as a result of many scripted logic updates to the compiled code, the performance of the application may deteriorate. This reduction in performance can be referred to as an accumulation of "script performance debt." In some cases, based on the amount of accumulated script performance debt, one or more scripts can be converted into compiled code. This compiled code can be submitted to the application marketplace provider for review and approval and can be delivered as a binary patch to the application. The binary patch can replace or be utilized instead of the previous script-based updates, which can recoup all of the script performance debt that was accumulated via the script-based updates.

Programming languages generally fall into one of two categories: Compiled or Interpreted. For purposes of this disclosure, a compiled language (sometimes referred to as binary code or precompiled machine code) is a programming language that is implemented by a compiler, which is a translator that generates machine code from source code. In contrast, for purposes of this disclosure, interpreted language is a programming language that is implemented by an interpreter, which is a step-by-step executor of source code, where no pre-runtime translation (e.g., compiling) takes place. An interpreted language (sometimes referred to as interpreted scripting language, scripting language, or scripts) includes non-binary code or non-compiled information objects, such as scripts, images (e.g., image information, texture information, and/or other information related to images), and/or other non-compiled information, that do not require the step of being compiled into machine-language instructions, but instead are interpreted. Example interpreted scripting languages include, but are not limited to, JavaScript, PHP, Python, VBScript. Compiled programs generally run faster than interpreted ones, at least because interpreted programs are generally reduced to machine instructions at runtime.

Overview of Video Game Environment

FIG. 1 illustrates an embodiment of a computing environment 100 for implementing a videogame patch. The computing environment 100 includes a network 108, a plurality of user computing systems 102, an interactive computing system 130, which includes application host systems 132, an application marketplace server 140, an update server 150, and a developer system 160. To simplify discussion and not to limit the present disclosure, FIG. 1 illustrates only one user computing system 102, one interactive computing system 130, one application marketplace server 140, one update server 150, and one developer system 160, though multiple devices or systems may be used.

Network

Any of the foregoing devices or systems of computing environment 100 may communicate via a network 108. Although only one network 108 is illustrated, multiple distinct and/or distributed networks 108 may exist. The network 108 can include any type of communication network. For example, the network 108 can include one or more of a wide area network (WAN), a local area network (LAN), a cellular network, an ad hoc network, a satellite network, a wired network, a wireless network, and so forth. In some embodiments, the network 108 can include the Internet.

User Computing System

The user computing system 102 can be controlled by a user. The user computing system 102 may include hardware and software components for establishing communications over the network 108. For example, the user computing system 102 may be equipped with networking equipment and network software applications (for example, a web browser) that facilitate communications via one or more networks (for example, the Internet or an intranet). The user computing system 102 may have varied local computing resources such as central processing units and architectures, memory, mass storage, graphics processing units, communication network availability and bandwidth, and so forth. Further, the user computing system 102 may include any type of computing system. For example, the user computing system 102 may include any type of computing device(s), such as desktops, laptops, video game platforms/consoles, television set-top boxes, televisions (for example, Internet TVs), network-enabled kiosks, car-console devices computerized appliances, wearable devices (for example, smart watches and glasses with computing functionality), and wireless mobile devices (for example, smart phones, PDAs, tablets, or the like), to name a few.

The user computing system 102 is capable of executing a game application 110, such as a video game, which may be stored and/or executed locally and/or in a distributed environment. In certain embodiments, the user computing system 102 may execute another application instead of or in addition to executing a portion of the game application 110, which may complement and/or interact with the game application 110 during execution of a gameplay session of the game application 110. In a locally executed game applications, generally, the game application 110 does not rely or utilize an external computing system (for example, the interactive computing system 130) to execute the game application 110. In distributed game applications, the user computing system 102 may execute a portion of the game application 110 and another system, such as the interactive computing system 130 or an application host system 132 of the interactive computing system 130, may execute another portion of the game application 110. For instance, the game may be a massively multiplayer online role-playing game (MMORPG) that includes a client portion executed by the user computing system 102 and a server portion executed by one or more application host systems 132. For the present discussion, the type of game application 110 can be a locally executable game, a distributed application, or an application that includes a portion that executes on the user computing system 102 and a portion that executes on at least one of the application host systems 132.

The user computing system can include various input devices 120 that can be used to capture player input for use during execution of a game application 110. The game application 110 can be configured to generate instructions to the computing resources 104 to output execution of the game application 110 on the display 122. User input from input devices 120 and/or game data may be used to generate display video for display on the display 122. Game data 114 can include game rules, prerecorded motion capture poses/paths, environmental settings, constraints (such as strength and velocity constraints), and skeleton models. A game engine 112 can receive the game data 114 and user inputs from the input devices 120 and can determine character events, such as actions, collisions, runs, throws, attacks and other events appropriate for the game. From the character events, appropriate motions or poses for the characters can be determined and rendered. Character images can be combined with animate, inanimate and background objects into a full scene. The full scene can be conveyed to a renderer, which can generate a new frame therefrom.

The game application 110 executed by the user computing system 102 may be created using a particular application programming interface (API) or compiled into a particular instruction set that may be specific to the user computing system 102. In some embodiments, user computing system 102 may be a general purpose computing device capable of executing game application 110 and non-game applications.

A game application 110 can be configured to be executed on the user computing system 102. The game application 110 may also be referred to as a videogame, a game, game code and/or a game program. A game application should be understood to include software code that a user computing system 102 can use to provide a game for a user to play. A game application 110 may comprise software code that informs user computing system 102 of processor instructions to execute, but may also include data used in the playing of the game, such as data relating to constants, images and other data structures. For example, in the illustrated embodiment, the game application includes a game engine 112 and game data 114.

The game engine 112 can be configured to execute aspects of the operation of the game application 110 within the user computing system 102. Execution of aspects of gameplay within a game application can be based, at least in part, on the user input received and the game data 114. The game data 114 can include game rules, prerecorded motion capture poses/paths, environmental settings, constraints, skeleton models, and/or other game application information.

The game engine 112 can execute gameplay within the game according to the game rules. Examples of game rules can include rules for scoring, possible inputs, actions/events, movement in response to inputs, and the like. Other components can control what inputs are accepted and how the game progresses, and other aspects of gameplay. During execution of the game application 110, the game application 110 can store game state information, which can include a game state, character states, environment states, scene object storage, and/or other information associated with a state of execution of the game application 110. For example, the game state information can identify the state of the game application at a specific point in time, such as a character position, character action, game level attributes, and other information contributing to a state of the game application. The game state information can include dynamic state information that continually changes, such as character movement positions, and static state information, such as the identification of a game level within the game.

The game engine 112 can receive the user inputs and determine in-game events, such as actions, collisions, runs, throws, attacks and other events appropriate for the game application 110. During operation, the game engine 112 can read in game data 114 and a game state information 116 to determine the appropriate in-game events. In one example, after the game engine 112 determines the character events, the character events can be conveyed to a movement engine that can determine the appropriate motions the characters should make in response to the events and passes those motions on to a physics engine. The physics engine can determine new poses for the characters and provide the new poses to a skinning and rendering engine. The skinning and rendering engine, in turn, can provide character images to an object combiner in order to combine animate, inanimate, and background objects into a full scene. The full scene can be conveyed to a renderer, which generates a new frame for display to the user. The process can repeated for rendering each frame during execution of the game application. Though the process has been described in the context of a character, the process can be applied to any process for processing events and rendering the output for display to a user.

The user computing system 102, such as the game application 110 on the user computing system 102, can communicate with an external server, such as the update server 150 or the interactive computing system 130, to retrieve information associated with the game, such as game patches, game authentication, clouds saves, or other features.

In some cases, the user computing system 102 can be a developer system 160. A developer system 160 can be utilized to manage, develop, and/or update the game application 110. For example, the developer system 160 can have the same or different capabilities and/or applications as the user computing system 102. In some cases, a developer of the developer system 160 can generate the game applications 110 and/or updates thereto. The game applications 110 and/or updates can be communicated to one or more systems, such as the interactive computing system 130, the application marketplace server 140, the update server, or the user computing system 102.

Interactive Computing System (e.g., Online Game Servers)

The interactive computing system 130 can include one or more application host systems 132. The interactive computing system 130 may include one or more computing systems configured to execute a portion of the game application 110 and/or host application. In some embodiments, the one or more application host systems 132 can include one or more computing devices, such as servers and databases that may host and/or execute a portion of one or more instances of the game application 110 and/or host application. In certain embodiments, instead of or in addition to executing a portion of the game application 110 and/or host application, the application host systems 132 may execute another application, which may complement and/or interact with the application 104 during execution of an instance of the application 104.

The application host systems 132 can be configured to execute a portion of the game application 110. In certain embodiments, the application host systems 132 may execute another application instead of or in addition to executing a portion of the game application 110, which may complement and/or interact with the game application 110 during execution of a gameplay session of the game application 110.

The interactive computing system 130 may enable multiple players or computing systems to access a portion of the game application 110. In some embodiments, the portion of the game application 110 executed by application host systems 132 of the interactive computing system 130 may create a persistent virtual world. This persistent virtual world may enable one or more players to interact with the virtual world and with each other in a synchronous and/or asynchronous manner. For purposes of the present disclosure, the term "player" can refer to a game application that is being operated by a person during a gameplay session.

In some cases, multiple instances of the persistent virtual world may be created or hosted by the interactive computing system 130. A set of players may be assigned to or may access one instance of the persistent virtual world while another set of players may be assigned to or may access another instance of the persistent virtual world. In some embodiments, the application host systems 132 may execute a hosting system for executing various aspects of a game environment. For example, in one embodiment, the game application 110 may be a competitive game, such as a first person shooter or sports game, and the host application system 132 can provide a dedicated hosting service for hosting multiplayer game instances or facilitate the creation of game instances hosted by user computing devices. In some embodiments, the host application system 132 can provide a lobby or other environment for users to virtually interact with one another. Such environments may include environments for conducting transactions between players, such as an auction house or type of environment for facilitating transactions.

In some embodiments, the interactive computing system 130 can be responsible for managing and/or distributing updates to the game application 110. For example, as described herein, the developer system 160 can develop the game application 110 or updates thereto. The interactive computing system 130 can be in communications with the developer system 160 so as to receive updates to the game application 110. The interactive computing system 130 can be in communications with the user computing system 102 and can communicate the update to the user computing system 102. For example, the interactive computing system 130 can transmit the update to the user computing system 102 or can provide a server from which the game application 110 and/or updates thereto can be downloaded by the user computing system 102.

Application Marketplace Server

The application marketplace server 140 can provide an application marketplace from which the game application 110 and/or updates thereto can be communicated to or downloaded by the user computing system 102. In some implementations, the application marketplace server 140 is controlled by a third party that does not create or develop the game application 110 or the updates. For example, the application marketplace server 140 can receive the game application 110 or updates from a developer system 160 or an update server 150. A provider of the application marketplace server 140 or the application marketplace reviews or approves of the game application 110 or updates before they are available for download through the application marketplace server 140. The game application 110 and/or updates that are available through the application marketplace server 140 typically include precompiled machine code.

An update from the application marketplace server 140 can include compiled code with changes from a previous version of the game application 110. Obtaining the updated version of the game application 110 may include downloading the updated version from application marketplace server 140. Obtaining the updated version of the game application 110 may include receiving a network address of another server, such as the interactive computing system 130, from the application marketplace server 140, and then requesting the updated version from this server.

The application marketplace of the application marketplace server 140 may exert some limitations and/or control over the release of updated versions of the game application 110. For example, a developer of the game application 110 or the updates to the game application 110 may be required to submit the game application 110 or update thereto to the application marketplace server 140 for review. Once game application 110 or update thereto is approved, it may be made available to users for download through the application marketplace server 140.

Due to this control, developers may experience inconveniences, inefficiencies, and/or other drawbacks associated with seeking and obtaining approval for game application 110 or update thereto from the provider of the application marketplace server 140.

The ability of user computing system 102, developer system 160, or interactive computing system 130 to update game assets including, for example, interpreted scripting language and/or other assets separate from the compiled code of game application 110 may enable a functional update of the game application 110 that does not require communication through application marketplace server 140. This may enhance one or more aspects of the updating process. The updating of game assets via interpreted scripting language that are different from compiled code may enable the developer system 160, or a developer associated with the developer system 160, to update the game application 110 piecemeal, and without requiring users to proactively update the game application 110 through the application marketplace server 150.

The game application 110 can be configured to automatically update individual assets (or sets of assets) on the installed application with little or no user interaction or interaction with the application marketplace.

Update Server

The update server 150 can be configured to communicate with the user computing system 102 such that the user computing system 102 can obtain updates to the game application 110. For example, the update server 150 can transmit the updates to the user computing system 102 via data packets. As another example, the user computing system 102 can download the updates from the update server 150. In some implementations, the update server 150 does not create or develop the game application 110 or the updates. For example, the update server 150 can receive the game application 110 or updates from a developer system 160, the interactive computing system 130, the application marketplace server 140, or the like A provider of the application marketplace server 140 or the application marketplace reviews or approves of the game application 110 or updates before they are available for download through the application marketplace server 140. The game application 110 and/or updates that are available through the application marketplace server 140 typically include precompiled machine code. In some implementations, the update server 150 can be incorporated and/or integrated into the interactive computing system 130 and/or the developer system 160.

Function Store

The game application 110 can include a function store, such as an electronic database, table, or array, which stores function assets that can be used to execute game functions of the game application. In some cases, a function asset that includes compiled code can be referred to as a code function asset, and a function asset that includes interpreted scripting language, can be referred to as a script function asset. The function store can be separate from application code that is used to execute the game application 110. For example, the function store can include various function assets and, rather than including the function assets itself, the application code can query the function store for a function asset to use in order to execute to a game function.

Figure 2:
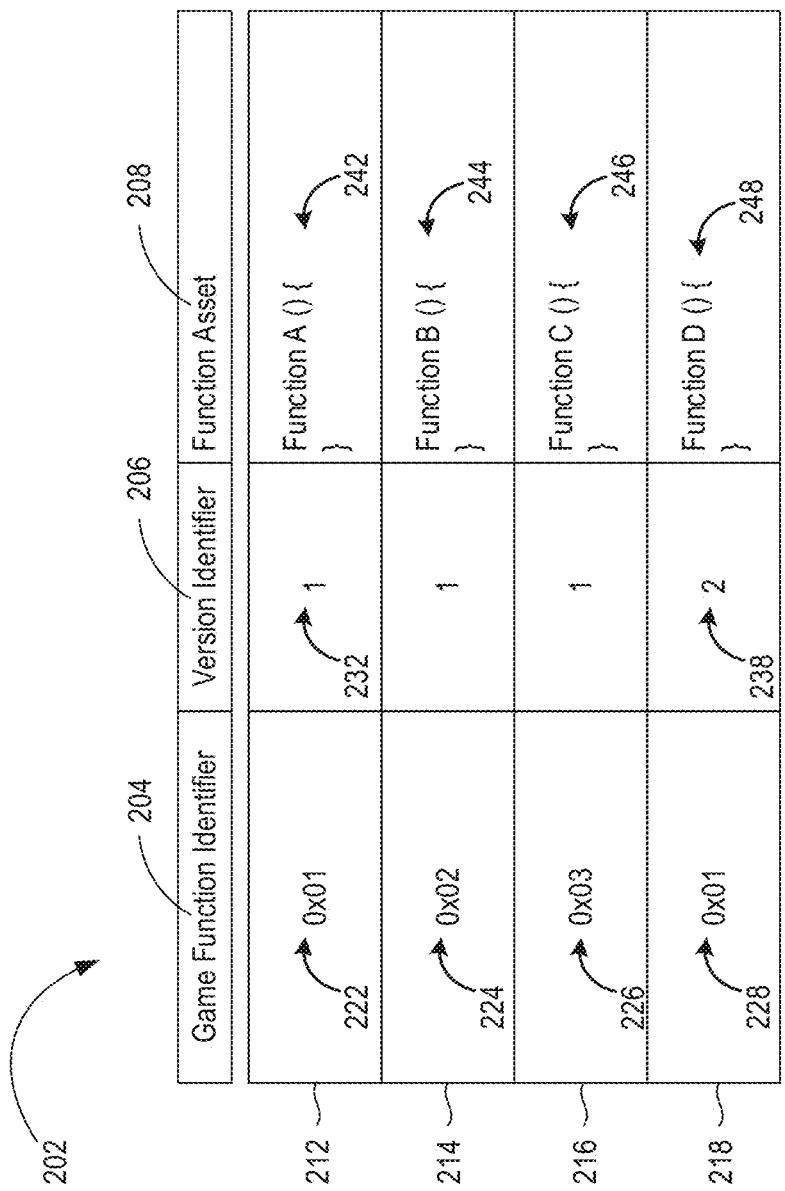
FIG. 2 illustrates a visual representation of a function store 202, in accordance with example embodiments.

FIG. 2 illustrates a visual representation of a function store 202, in accordance with example embodiments. In this example, the function store 202 includes a table that has three columns: game function identifier 204, version identifier 206, and function asset identifier 208. In addition, the table has rows 212, 214, 216, and 218 that are related to function assets. For example, row 216 indicates that function asset 226 is associated with version identifier 224 and game function identifier 222.

A game function identifier can be utilized to identify the game function to which a particular function asset corresponds. For example, as illustrated by the function store 202 in FIG. 2, the first function asset 242 corresponds to a first game function identifier 222 ("0x01"), the second function asset 244 corresponds to a second game function identifier 224 ("0x02"), the third function asset 246 corresponds to a third game function identifier 226 ("0x03"), and the fourth function asset 248 corresponds to the first game function identifier 228 ("0x01"). Notably, the first function asset 242 and the fourth function asset 248 both correspond to the first game function.

A version identifier can be utilized to identify the version of a particular function asset. For example, as illustrated, although the first function asset 242 and the fourth function asset 248 correspond to the first game function, they two function assets 242, 248 are distinguishable from each other at least by their version identifiers 232, 238. For example, the function store 202 can be queried for the function asset corresponding to game function identifier "0x01". In this example, game function identifier 222 and game function identifier 228 matches "0x03". Based at least in part on the game function identifiers 222 and 228 matching the queried game function identifier (e.g., "0x01"), the function store 202 can identify one or more of function assets 242 or 248. In some cases, for example if more than one function asset corresponds to a queried game function, the function store 202 can use the version identifiers to select the function asset to return. In this example, the first function asset 242 has a version identifier of "1," while the fourth function asset 248 has a version identifier of "2." In some cases, based at least in part on the version identifier 238 (i.e., "2") corresponding to a later or more recent version than the version identifier 232 (i.e., "1"), the function store 202 can return the function asset 248. In some cases, a game function identifier can include a set of numbers, letters, alphanumeric characters, or other identifier that associates the particular game function with a function asset. In some cases, a function asset can include a function that can be executed. In some cases, a function asset can include the memory address of a function that can be executed. For example, the function asset can be a pointer that references another location in memory.

Binary Release

Figure 3:
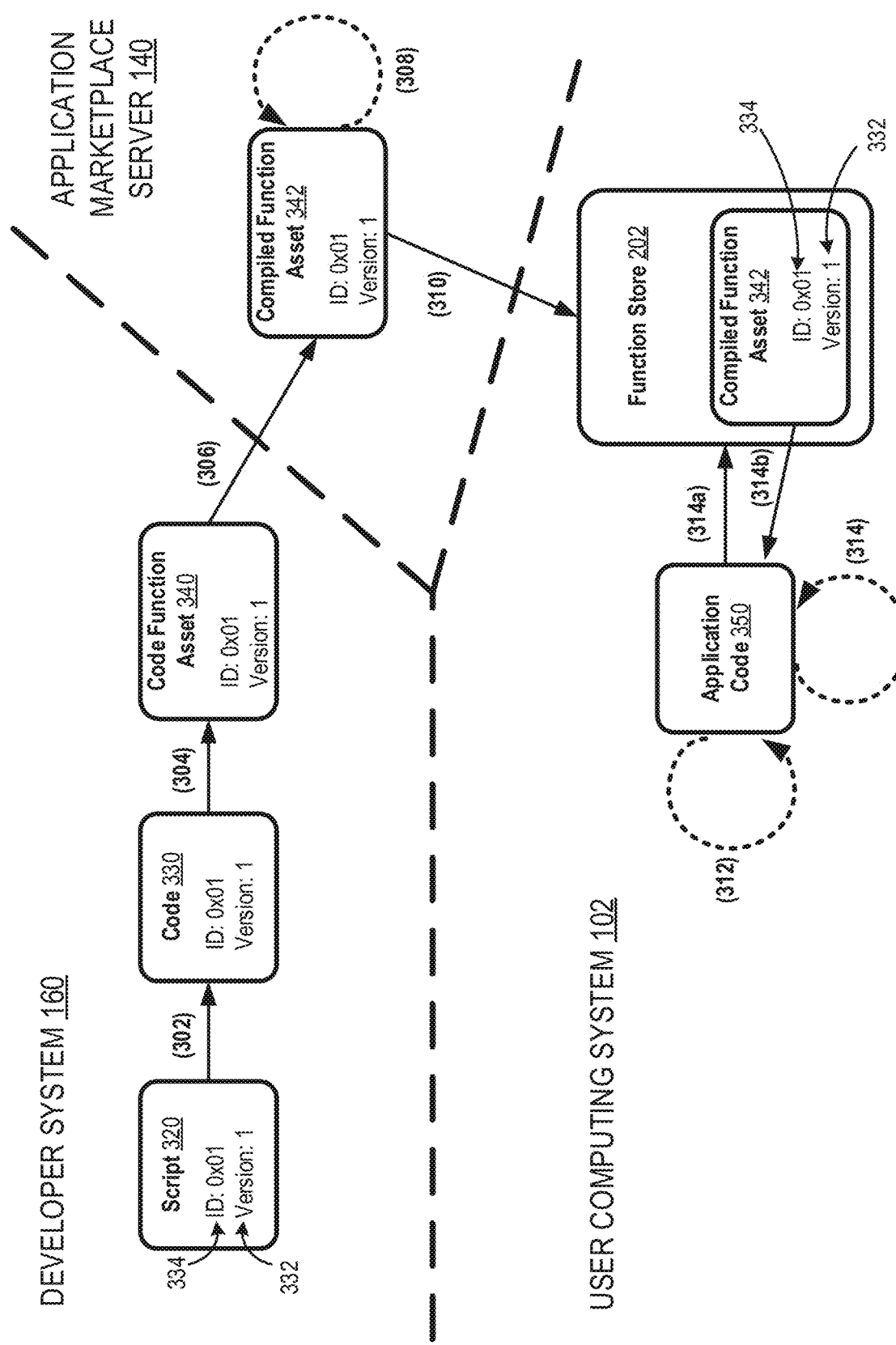
FIG. 3 is a data flow diagram illustrative of an embodiment of distributing a function of a video game to a user computing device.

FIG. 3 is a data flow diagram illustrative of an embodiment of distributing a function of a video game to a user computing device. Although FIG. 3 illustrates the distribution of a single function of a video game, it will be understood that other functions of the video game, as well as application code of the video game, can be prepared and distributed using a similar process. Furthermore, although FIG. 3 only shows interactions between the developer system 160, the marketplace server 150, and the user computing system 102, it will be understood that fewer, more, or different devices or systems can be utilized as desired and/or be configured differently. For example, the communications can occur directly or via the network 108. As another example, in some cases, the developer system 160 can communicate with the user computing system 102 or the update server 150, rather than communicating with the application marketplace server 140. Furthermore, it will be understood that the various steps described herein with reference to FIG. 3 can be implemented in a variety of orders. For example, some steps can be implemented concurrently or the order changed as desired. Furthermore, it will be understood that fewer, more, or different steps can be used.

In this example, a game application 110 (e.g., a video game) that is written in an interpreted scripting language (script 320) is completed and is ready for distribution. Although in this example, at step 302, the developer system 160 converts the script 320 into binary code 330 and compiles it. In this example, the script 320 is associated with a first game function (specifically, game function "0x01"), which is denoted by the game function identifier 334. Furthermore, the script 320 is associated with a version identifier 332. Because this example represents the initial distribution of the game application 110, the version identifier 332 corresponds to the first or original version of the first game function.

At step 304, the developer system 160 wraps the binary code 330 as a code function asset 340. At step 306, the developer system 160 communicates the code function asset 340 to the application marketplace server 140. As described herein, providers of the marketplace server 140 review the code function asset 340. Once the update is approved, at step 308, the code function asset 340 is compiled to form a compiled function asset 342 (sometimes referred to as a code function asset), and the compiled function asset 342 is made available for download from the application marketplace server 140.

At step 310, the user computing system 102 receives or downloads the compiled function asset 342 from the application marketplace server 140. In some cases, in addition to the compiled function asset 342, the user computing system 102 may also receive or download the application code 350 and/or one or more other function assets from the application marketplace server 140.

Also at step 310, the user computing system 102 stores the compiled function asset 342 in the function store 202. As shown in FIG. 3, the game function identifier 334 and the version identifier 332 remain associated with the compiled function asset 342 when it is stored in the function store 202.

At step 312, the user computing system 102 executes the game application 110 using application code 350 to provide a game for a user to play. As described herein, the game application 110 may be stored and/or executed locally on the user computing system 102 and/or in a distributed environment.

At step 314, the user computing system 102 executes the first game function within the game application 110. In some cases, executing the first game function can itself include multiple steps, such as steps 314a or 314b. For example, to execute the first game function, at step 314a, the application code queries the function store 202 for a function asset that is associated with the first game function, i.e., game function "0x01". To identify which function asset to return to the application code, the function store 202 identifies the one or more function assets that correspond to game function "0x01". To do this, the function store 202 identifies the one or more function assets that have a game function identifier corresponding to game function "0x01". In this example, the compiled function asset 342 is the only function asset in the function store 202 that has a game function identifier 334 that corresponds to game function "0x01". In some cases, based on a determination that only one function asset is available that corresponds to the requested game function, the function store 202 can return that function asset to the application code 350. Alternatively, in some cases, to identify which function asset to return, the function store 202 can additionally or alternatively review or check the version identifier 332 of the compiled function asset 342 to ensure the selected function asset is the latest, or most recent, version. Thus, based at least in part on the game function identifier 334 corresponding to the first game function and/or the version identifier 332 being associated with latest or most recent version, at step 314b, the function store 202 returns the compiled function asset 342 to the application code 350, which the application code 350 uses to execute the first game function.

It will be understood that the various steps described herein with respect to FIG. 3 can be implemented in a variety of orders, and that one or more of the steps of FIG. 3 can be implemented concurrently and/or the order changed, as desired. Furthermore, it will be understood that fewer, more, or different steps can be used as part of the routine of FIG. 3. For example, in some cases, certain steps can be omitted, such as, but not limited to, steps 302, 304, 306, 308, 310, 312, 314a, or 314b. For example, in some embodiments, the developer system 160 can communicate with the user computing system 102 rather than the application marketplace server 140.

Data Patch

Figure 4:
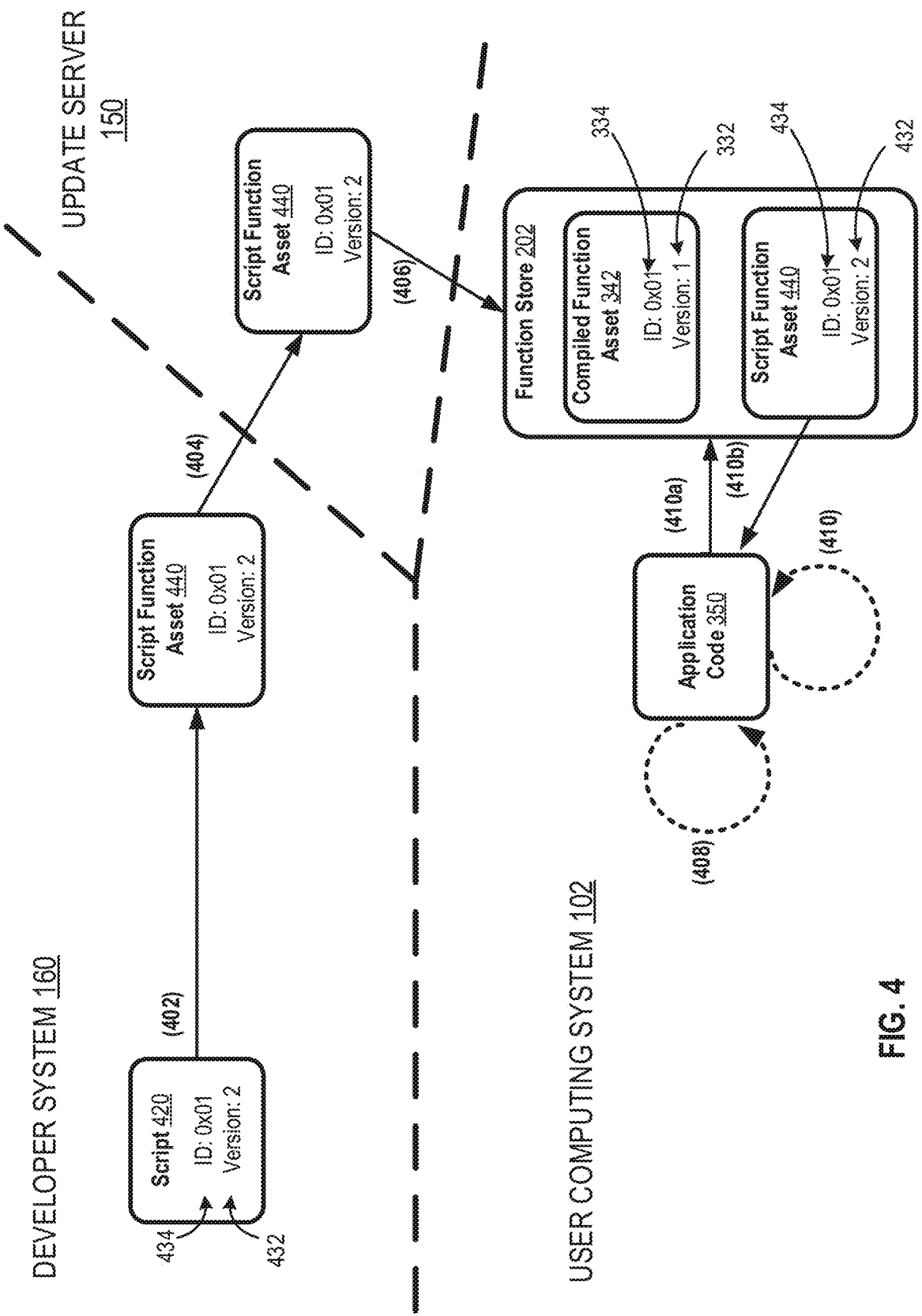
FIG. 4 is a data flow diagram illustrative of an embodiment of distributing a data update of a video game to a user computing device.

FIG. 4 is a data flow diagram illustrative of an embodiment of distributing a data update of video game to a user computing device. Although FIG. 4 illustrates the distribution of a single function of a video game, it will be understood that other functions of the video game, as well as application code of the video game, can be prepare and distributed using a similar process. Furthermore, although FIG. 4 only shows interactions between the developer system 160, the update server 150, and the user computing system 102, it will be understood that fewer, more, or different devices or systems can be utilized as desired and/or be configured differently. For example, the communications can occur directly or via the network 108. As another example, in some cases, the developer system 160 or the interactive computing system 130 can communicate with the user computing system 102, rather than communicating to the update server 150 which communicates to the user computing system 102. Furthermore, it will be understood that the various steps described herein with reference to FIG. 4 can be implemented in a variety of orders. For example, some steps can be implemented concurrently or the order changed as desired. Furthermore, it will be understood that fewer, more, or different steps can be used.

Continuing from the example of FIG. 3, in this example, a binary release of a game application 110 has previously occurred, and one or more updates or changes to a function asset associated with the first game function are completed and ready for distribution. At step 402, in contrast to step 302 of FIG. 3, the developer system 160 does not convert the script 420 into binary code and compile it. Rather, the developer system 160 wraps the script 420 as a script function asset 440. In this example, similar to the script 320 of FIG. 3, the script 420 is configured to perform the first game function, which is denoted by the game function identifier 434. However, because the script function asset 440 is different from the code function asset 340, it is associated with a different version identifier 432. In this case, because the script 420 was developed after the script 320 of FIG. 3, it is associated with a new version, in this case version 2.

Notably, the script function asset 440 can be incorporated into the video game without requiring the video game to be recompiled. Furthermore, because the script 420 was not converted into compiled code, the provider of the application marketplace server 140 does not require that the script function asset 440 be reviewed and/or approved by the provider of the application marketplace server 140 prior to it being distributed to a user computing device 102. Rather, the script function asset 440 can be distributed, for example via the update server 150, to the user computing device 102 as a data update that can be used to update one or more functions of the game during runtime of the game application 110. By avoiding the review and approval process, the update (e.g., the script function asset 440) can be delivered quickly and efficiently to the user computing device 102. Furthermore, in some cases, the interpreted scripting language can be written in the same scripting language that the compiled code of the game application was written in prior to compiling the code. This can advantageously increase a developer's ability to develop updates to the game application 110.

At step 404, the developer system 160 communicates the script function asset 440 to the update server 150, and at step 406 the update server 150 makes the script function asset 440 available to the user computing system 102. For example, the user computing system 102 receives and/or downloads the script function asset 440 from the update server 150 and stores the script function asset 440 in the function store 202. For example, the user computing system 102 can update the function store 202 to include the script function asset 440. In some implementations, the update to the function store 202 occurs without recompiling and/or restarting the game application. In some implementations, the update server 150 can perform at least some processing on the script function asset 440 before it is provided to the user computing system 102. In some cases, the developer system 160 can provide the script function asset 440 directly to the user computing system 102. As shown in FIG. 4, the game function identifier 434 and the version identifier 432 remain associated with the script function asset 440 when it is stored in the function store 202. Furthermore, as illustrated, the previously stored code function assets 340 can remain in the function store 202, despite the game function identifier 334 of the code function asset 340 being the same as the game function identifier 434 of the script function asset 440.

At step 408, similar to step 312 of FIG. 3, the user computing system 102 executes a game application 110 using application code 350 to provide a game for a user to play.

At step 410, similar to step 314 of FIG. 4, the user computing system 102 executes the first game function within the game application 110. In some cases, step 410 can include steps, such as steps 410a or 410b. For example, at step 410a, the user computing system 102 can query the function store 202 and, at step 410b, the function store 202 can return the script function asset 440 based on the query. The user computing system 102 can execute the first game function using the script function asset 440.

At step 410a, the function store 202 receives the query from the application code 350 for the function asset that is associated with the first game function i.e., game function "0x01". To identify which function asset to return to the application code, the function store 202 identifies the one or more function assets that correspond to game function "0x01". To do this, the function store 202 identifies the one or more function assets that have a game function identifier corresponding to game function "0x01". In this example, as indicated by the game function identifiers 334 and 434, the function store 202 includes two code function assets 340 and 440 that each correspond to the first game function (i.e., game function "0x01"). For example, as indicated above, the code function asset 340 may correspond to an original, binary version of a function asset associated with the first game function, while the script function asset 440 may correspond to an updated, script version of the function asset associated with the first game function.

To identify which function asset to return to the application code 350, the function store 202 reviews or checks the version identifiers 332, 432 of each of the stored function assets 340, 440. In this case, the script function asset 440 corresponds to a later or more recent version than the code function asset 340. Thus, based at least in part on the game function identifier 434 corresponding to the first game function and/or the version identifier 432 being associated with a later or more recent version than the version identifier 332, at step 410b, the function store 202 returns the script function asset 440 to the application code 350, which the application code 350 uses to execute the first game function.

It will be understood that the various steps described herein with respect to FIG. 4 can be implemented in a variety of orders, and that one or more of the steps of FIG. 4 can be implemented concurrently and/or the order changed, as desired. Furthermore, it will be understood that fewer, more, or different steps can be used as part of the routine of FIG. 4. For example, in some cases, certain steps can be omitted, such as, but not limited to, steps 402, 404, 406, 408, 410a, or 410b. For example, in some embodiments, the developer system 160 can communicate with the user computing system 102 rather than the application marketplace server 140.

Furthermore, it will be understood that the various steps described herein with reference to FIG. 3 can be implemented in the routine of FIG. 4, in a variety of orders. For example, some or all of various steps of FIG. 3 can be implemented concurrently with any one or more of the steps of FIG. 5 or change the order as desired.

Binary Patch

Figure 5:
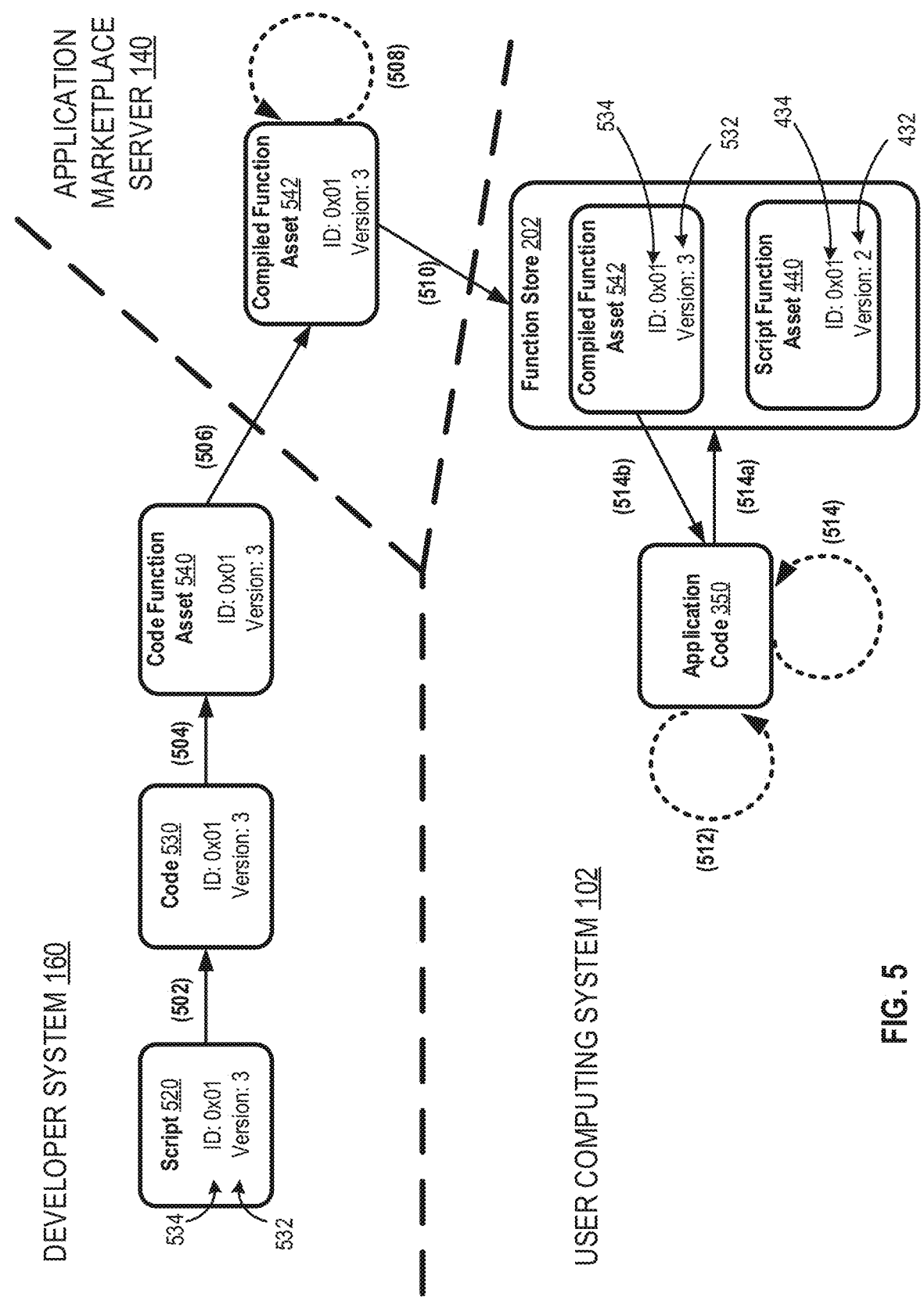
FIG. 5 is a data flow diagram illustrative of an embodiment of distributing a binary patch of a video game to a user computing device.

FIG. 5 is a data flow diagram illustrative of an embodiment of distributing a binary patch of a video game to a user computing device. Although FIG. 5 illustrates the distribution of a single function of a video game, it will be understood that other functions of the video game, as well as application code of the video game, can be prepare and distributed using a similar process. Furthermore, although FIG. 5 only shows interactions between the developer system 160, the application marketplace server 140, and the user computing system 102, it will be understood that fewer, more, or different devices or systems can be utilized as desired and/or be configured differently. For example, the communications can occur directly or via the network 108. As another example, in some cases, the developer system 160 can communicate with the update server 150 instead, or in addition or, the application marketplace server 140. Furthermore, it will be understood that the various steps described herein with reference to FIG. 5 can be implemented in a variety of orders. For example, some steps can be implemented concurrently or the order changed as desired. Furthermore, it will be understood that fewer, more, or different steps can be used.

In general, an interpreted scripting language can be orders of magnitude slower than compiled code. As such, over time, and as a result of many data updates to the game application 110, the performance of the game application 110 can be reduced. This reduction in performance can be referred to as an accumulation of "script performance debt." Over time the game application 100 can accumulate "script performance debt" through shipping a large number of data updates. In this example, one or more data updates may have been previously provided to the user computing device 102, and the developer has developed a script for conversion into a binary patch. In some cases, the binary patch can replace or be utilized instead of the previous data updates, which can recoup some or all of the script performance debt that was accumulated via the data updates.

At steps 502 and 504, similar to steps 302 and 304 of FIG. 3, the developer system 160 coverts the script 520 into binary code 530, compiles it, and wraps the binary code 530 as a code function asset 540. In this example, the game function identifier 534 corresponds to the game function identifiers 334 and 434 of FIGS. 3 and 4, respectively. However, the version identifier 532 has been updated to a newer version, version 3.

At step 506, similar to step 306 of FIG. 3, the developer system 160 communicates the code function asset 540 to the application marketplace server 150. As described herein, providers of the marketplace server 140 review the code function asset 540. Once the update is approved, at step 508, the code function asset 540 is compiled to form a compiled function asset 542 (sometimes referred to as a code function asset), and the compiled function asset 542 is made available for download from the application marketplace server 140.

At step 510, similar to step 310 of FIG. 3, the user computing system 102 receives and/or downloads the compiled function asset 542 from the application marketplace server 150 and stores the compiled function asset 542 in the function store 202. As illustrated, the previously stored script function asset 440 from FIG. 4 can remain in the function store 202. Similarly, in some cases, the previously stored compiled function asset 342 from FIG. 3 can remain in the function store 202. Alternatively, in some implementations, the binary patch removes the script function asset 440 and/or the compiled function asset 342 from the function store 202.

At step 512, similar to step 312 of FIG. 3, the user computing system 102 executes a game application 110 using application code 350 to provide a game for a user to play.

At step 514, the user computing system 102 executes a first game function within the game application 110. In some cases, step 514 can include steps, such as steps 514a or 514b. For example, to execute the first game function, at step 514a, the application code queries the function store 202 for the function asset that is associated with the first game function. In this case, the first game function is game function "0x01". Thus, to identify which function asset to return to the application code, the function store 202 identifies the one or more function assets that correspond to game function "0x01". To do this, the function store 202 identify the one or more function assets that have a game function identifier corresponding to game function "0x01". In this example, both the compiled function asset 542 and the script function asset 440 include a game function identifier 534, 434 that correspond to game function "0x01".

To identify which function asset to return to the application code 350, the function store 202 can review or check the version identifiers 532, 432 of both the compiled function asset 542 and the script function asset 440. In this case, as indicated be the higher version identifier, the compiled function asset 542 corresponds to a later, or more recent, binary patch associated with the first game function, while the script function asset 440 corresponds to an earlier, or less recent, data patch associated with the first game function. Thus, based at least in part on the game function identifier 534 corresponding to the first game function and/or the version identifier 532 being associated with a later or more recent version than the version identifier 432, at step 514b, the function store 202 returns the compiled function asset 542 to the application code 350, which the application code uses to execute the first application.

It will be understood that the various steps described herein with respect to FIG. 5 can be implemented in a variety of orders, and that one or more of the steps of FIG. 5 can be implemented concurrently and/or the order changed, as desired. Furthermore, it will be understood that fewer, more, or different steps can be used as part of the routine of FIG. 5. For example, in some cases, certain steps can be omitted, such as, but not limited to, steps 502, 504, 506, 508, or 510. For example, in some embodiments, the developer system 160 can communicate with the user computing system 102 rather than the application marketplace server 140.

Furthermore, it will be understood that the various steps described herein with reference to FIGS. 3 and/or 4 can be implemented in the routine of FIG. 5, in a variety of orders. For example, some or all of various steps of FIGS. 3 and/or 4 can be implemented concurrently with any one or more of the steps of FIG. 5 or change the order as desired.

Process for Updating

Figure 6:
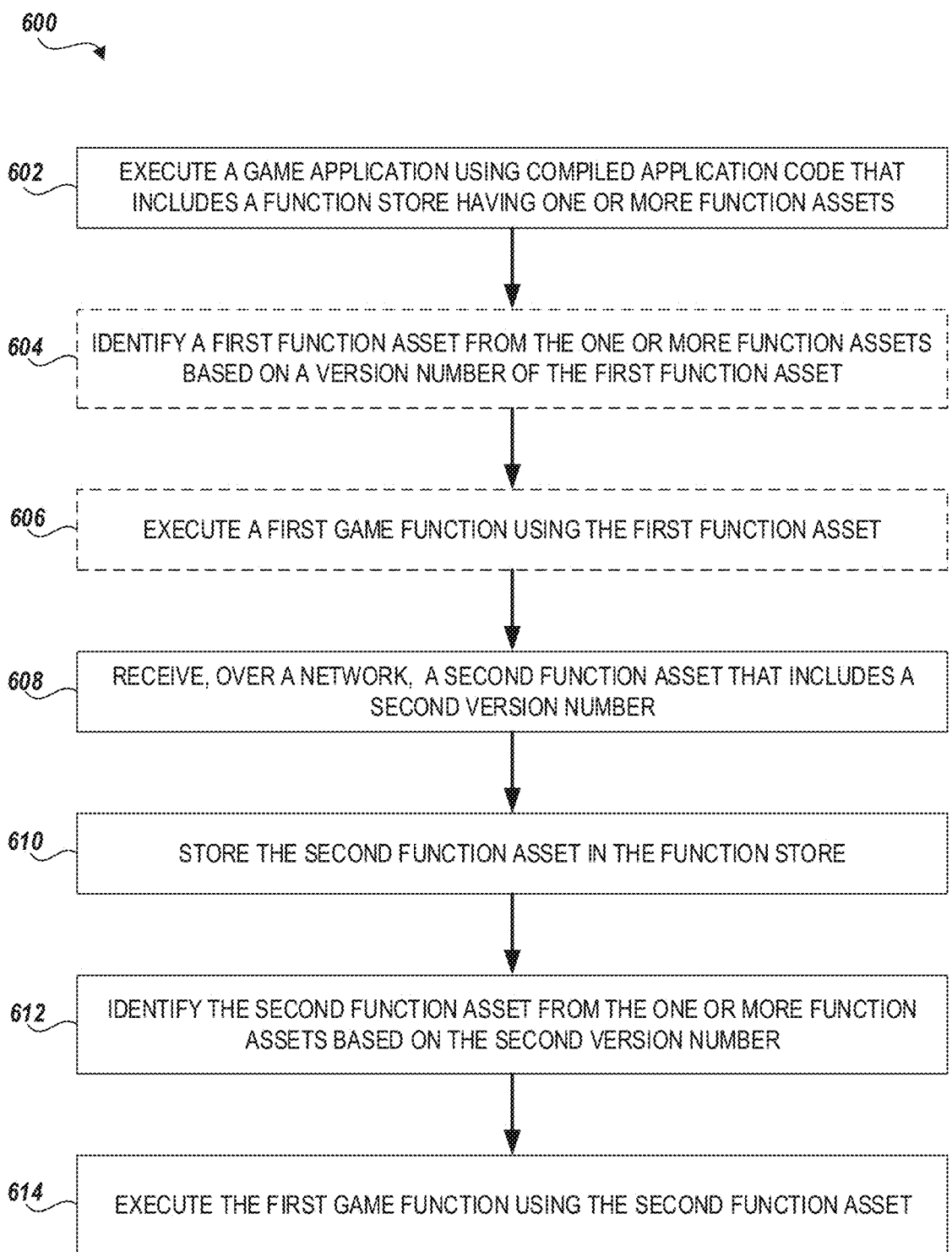
FIG. 6 illustrates an embodiment of a flowchart of a process for distributing a video game and updates thereto.

FIG. 6 illustrates an embodiment of a flowchart of a process for distributing a video game and updates thereto. The process 600 can be implemented by any system or combination of systems. For example, the process 600, in whole or in part, can be implemented by one or more devices or systems of the computing environment 100 of FIG. 1, such as a user computing systems 102, an interactive computing system 130, an application marketplace server 140, an update server 150, or a developer system 160. Although any number of systems, in whole or in part, can implement the process 600 to simplify discussion, the process 600 will be described with respect to particular systems. Further, although embodiments of the process 600 may be performed with respect to variations of systems comprising various game application environments, to simplify discussion, the process 600 will be described with respect to the computing environment 100 of FIG. 1. Furthermore, it will be understood that the various blocks described herein with reference to FIG. 3 can be implemented in a variety of orders. For example, computing device 100 can implement some blocks concurrently or change the order as desired. Furthermore, it will be understood that fewer, more, or different blocks can be used. For example, in some embodiments, the solid blocks are part of routine 600 and the dotted blocks are not implemented. However, it will be understood that any of the blocks (and more or different blocks) can be implemented as part of routine 600.

At block 602, similar to steps 312, 408, and 512 of FIGS. 3, 4, and 5, respectively, the user computing system 102 executes a game application 110 to provide a game for a user to play. For example, the game application 110 may be downloaded from the application marketplace server 140 via the network 108.

The user computing system 102 can execute the game application 110 using application code. The application code can include compiled software code that the user computing system 102 uses to provide the game for the user to play. The compiled software code can inform the user computing system 102 of processor instructions to execute and can include data used in the playing of the game, such as data relating to constants, images and other data structures. In some cases, the game application 110 includes a function store, such as function store 202, which stores a plurality of function assets that correspond to game functions.

At block 604, in some cases, user computing system 102 identifies a first function asset from the plurality of function assets stored in the function store. To identify which function asset to return to the application code, the function store 202 identifies the one or more function assets that correspond to a first game function. For example, as described herein, each of the plurality of function assets stored in the function store can have an associated game function identifier and/or version identifier. Based at least in part on a game function identifier and/or a version identifier associated with the first function asset, the user computing system 102 identifies the first function asset.

At block 606, in some cases, the user computing system 110 executes the first game function using the first function asset.

At block 608, similar to step 406 of FIG. 4, during runtime of the game application, the user computing system 102 receives a second function asset via the network. The second function asset can be in the form of a data packet that the user computing system 102 receives and/or downloads from an update server1 150.

At block 610, similar to step 406 of FIG. 4, the user computing system 102 stores the second function asset in the function store. As described herein, the second function asset can include an associated game function identifier and/or the version identifier 432.

At block 612, similar to step 410a of FIG. 4, the user computing system 102 can identify the second function asset from the plurality of function assets stored in the function store. To determine which function asset to identify, the user computing system 102 identifies the one or more function assets that correspond to first game function. In this example, each of the first function asset and the second function asset as associated with the first game function. To determine which function asset to identify, the user computing system 102 reviews or checks the version identifiers of each of the first function asset and the second function asset. Based at least in part on the second version identifier associated with the second function asset, the user computing system 102 identifies the second function asset.

At block 606, the user computing system 110 executes the first game function using the second function asset, rather than the first function asset.

It will be understood that the various blocks described herein can be implemented in a variety of orders, and that the computing device 100 can implement one or more of the blocks concurrently and/or change the order, as desired. For example, the computing device 100 can concurrently identify the first function asset and identify the second function asset. Similarly, the computing device 100 can concurrently execute the game application and the first game function. Further still, in some cases, the computing device 100 can receive the second function asset prior to, or concurrently with, the execution of the game application or the first game function.

Furthermore, it will be understood that fewer, more, or different blocks can be used as part of the routine 600. For example, in some cases, the routine 600 can omit certain blocks, such as, but not limited to, blocks 602, 604, 606, 608, and/or 610. For example, in some embodiments, the computing device 100 may not identify the first function asset or execute the first function asset.

In addition, it will be understood that the various steps described herein with reference to FIGS. 3, 4, and/or 5 can be implemented in routine 600, in a variety of orders. For example, the computing device 100 can implement some or all of various steps of FIGS. 3, 4, and/or 5 in routine 600 concurrently with any one or more of the blocks of routine 600 or change the order as desired.

Overview of Computing Device

Figure 7:
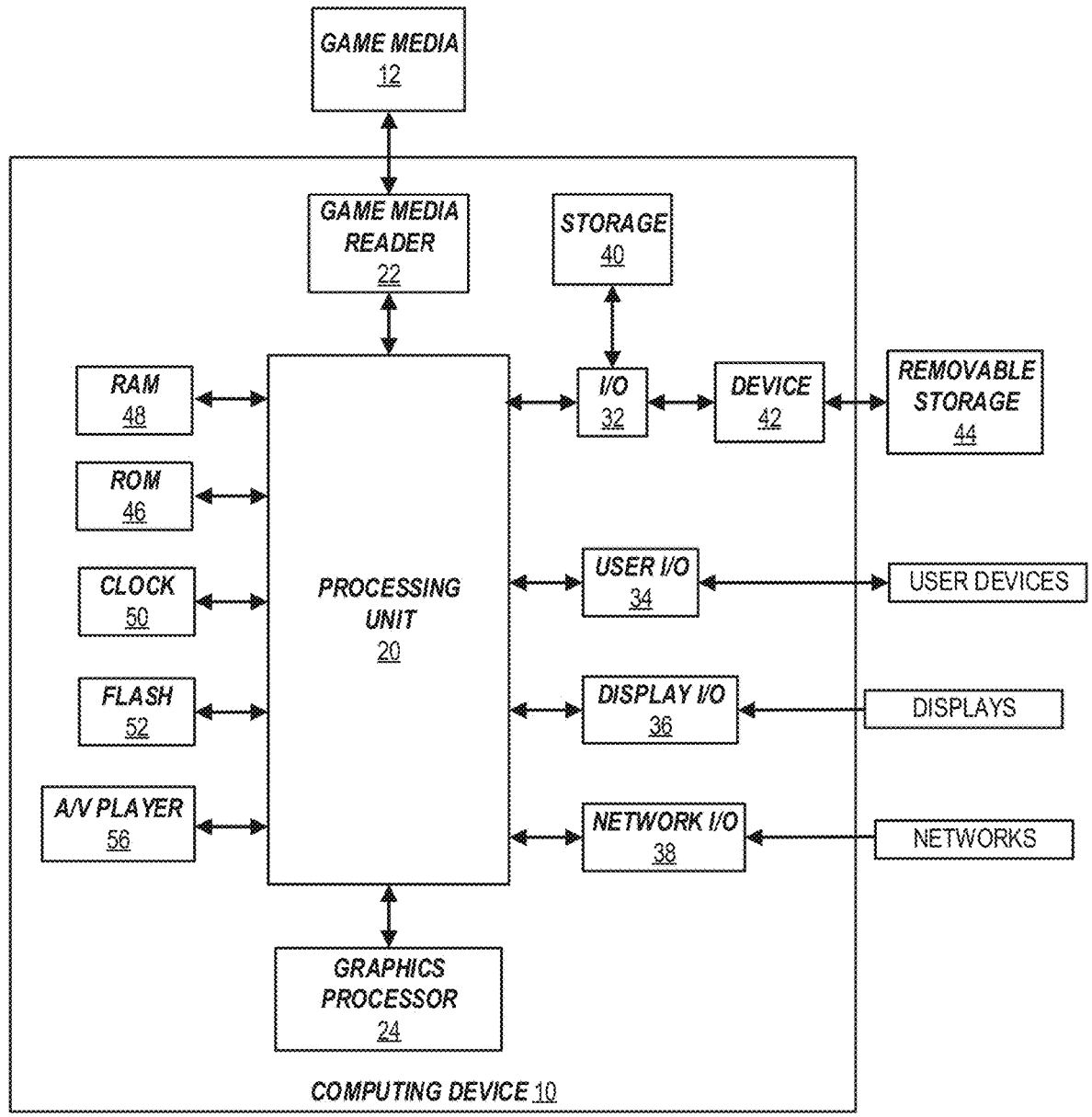
FIG. 7 illustrates an embodiment of a computing device.

FIG. 7 illustrates an embodiment of computing device 10 according to the present disclosure. Other variations of the computing device 10 may be substituted for the examples explicitly presented herein, such as removing or adding components to the computing device 10. The computing device 10 may include a game device, a smart phone, a tablet, a personal computer, a laptop, a smart television, a car console display, a server, and the like. As shown, the computing device 10 includes a processing unit 20 that interacts with other components of the computing device 10 and also external components to computing device 10. A media reader 22 is included that communicates with media 12. The media reader 22 may be an optical disc reader capable of reading optical discs, such as CD-ROM or DVDs, or any other type of reader that can receive and read data from game media 12. One or more of the computing devices may be used to implement one or more of the systems disclosed herein.

Computing device 10 may include a separate graphics processor 24. In some cases, the graphics processor 24 may be built into the processing unit 20. In some such cases, the graphics processor 24 may share Random Access Memory (RAM) with the processing unit 20. Alternatively, or in addition, the computing device 10 may include a discrete graphics processor 24 that is separate from the processing unit 20. In some such cases, the graphics processor 24 may have separate RAM from the processing unit 20. Computing device 10 might be a handheld video game device, a dedicated game console computing system, a general-purpose laptop or desktop computer, a smart phone, a tablet, a car console, or other suitable system.

Computing device 10 also includes various components for enabling input/output, such as an I/O 32, a user I/O 34, a display I/O 36, and a network I/O 38. I/O 32 interacts with storage element 40 and, through a device 42, removable storage media 44 in order to provide storage for computing device 10. Processing unit 20 can communicate through I/O 32 to store data, such as game state data and any shared data files. In addition to storage 40 and removable storage media 44, computing device 10 is also shown including ROM (Read-Only Memory) 46 and RAM 48. RAM 48 may be used for data that is accessed frequently, such as when a game is being played or the fraud detection is performed.

User I/O 34 is used to send and receive commands between processing unit 20 and user devices, such as game controllers. In some embodiments, the user I/O can include a touchscreen inputs. The touchscreen can be capacitive touchscreen, a resistive touchscreen, or other type of touchscreen technology that is configured to receive user input through tactile inputs from the user. Display I/O 36 provides input/output functions that are used to display images from the game being played. Network I/O 38 is used for input/output functions for a network. Network I/O 38 may be used during execution of a game, such as when a game is being played online or being accessed online and/or application of fraud detection, and/or generation of a fraud detection model.

Display output signals produced by display I/O 36 comprising signals for displaying visual content produced by computing device 10 on a display device, such as graphics, user interfaces, video, and/or other visual content. Computing device 10 may comprise one or more integrated displays configured to receive display output signals produced by display I/O 36. According to some embodiments, display output signals produced by display I/O 36 may also be output to one or more display devices external to computing device 10, such a display 16.

The computing device 10 can also include other features that may be used with a game, such as a clock 50, flash memory 52, and other components. An audio/video player 56 might also be used to play a video sequence, such as a movie. It should be understood that other components may be provided in computing device 10 and that a person skilled in the art will appreciate other variations of computing device 10.

Program code can be stored in ROM 46, RAM 48 or storage 40 (which might comprise hard disk, other magnetic storage, optical storage, other non-volatile storage or a combination or variation of these). Part of the program code can be stored in ROM that is programmable (ROM, PROM, EPROM, EEPROM, and so forth), part of the program code can be stored in storage 40, and/or on removable media such as game media 12 (which can be a CD-ROM, cartridge, memory chip or the like, or obtained over a network or other electronic channel as needed). In general, program code can be found embodied in a tangible non-transitory signal-bearing medium.

Random access memory (RAM) 48 (and possibly other storage) is usable to store variables and other game and processor data as needed. RAM is used and holds data that is generated during the execution of an application and portions thereof might also be reserved for frame buffers, application state information, and/or other data needed or usable for interpreting user input and generating display outputs. Generally, RAM 48 is volatile storage and data stored within RAM 48 may be lost when the computing device 10 is turned off or loses power.

As computing device 10 reads media 12 and provides an application, information may be read from game media 12 and stored in a memory device, such as RAM 48. Additionally, data from storage 40, ROM 46, servers accessed via a network (not shown), or removable storage media 46 may be read and loaded into RAM 48. Although data is described as being found in RAM 48, it will be understood that data does not have to be stored in RAM 48 and may be stored in other memory accessible to processing unit 20 or distributed among several media, such as media 12 and storage 40.

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules executed by a computing system that includes one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (for example, not all described acts or events are necessary for the practice of the algorithms). Moreover, in certain embodiments, acts or events can be performed concurrently, for example, through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, for example, a combination of a DSP and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, etc., may be either X, Y, or Z, or any combination thereof (for example, X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

It should be emphasized that many variations and modifications may be made to the above-described embodiments, the elements of which are to be understood as being among other acceptable examples. All such modifications and variations are intended to be included herein within the scope of this disclosure.

What is claimed is:

1. A method for executing a game application, on a client computing device, the method comprising:
   by one or more processors configured with computer-readable instructions,
      executing a game application on a client computing device using application code comprising a function store, wherein the function store comprises one or more function assets, the one or more function assets including at least a first function asset associated with a first game function, wherein the first function asset is compiled machine code and includes a first version identifier; and
      during runtime of the game application:

receiving, over a network, a data packet that includes a second function asset that is associated with the first game function, wherein the second function asset is non-compiled code and includes a second version identifier, updating the function store to include the second function asset as one of the one or more function assets of the function store, wherein said updating occurs without recompiling the game application, and executing the first game function, wherein said executing the first game function comprises:
identifying the first function asset and the second function asset as being associated with the first game function,
selecting the second function asset instead of the first function asset based, at least in part, on a comparison of the second version identifier to the first version identifier, and
executing the first game function using the second function asset based, at least in part, on said selecting.

2. The method of claim 1, further comprising, prior to said receiving the data packet, executing the first game function using the first function asset based, at least in part, on the first version identifier.

3. The method of claim 1, wherein said selecting the second function asset instead of the first function asset comprises:
comparing the first version identifier with the second version identifier, and
identifying the second version identifier based, at least in part, on a determination that the second version identifier corresponds to a newer version identifier than does the first version identifier.

4. The method of claim 1, wherein each of the first function asset and the second function asset includes a game function identifier associated with the first game function, wherein said identifying the first function asset and the second function asset as being associated with the first game function comprises identifying the first function asset and the second function asset from other function assets in the function store based, at least in part, on the game function identifier of the first function asset and the second function asset.

5. The method of claim 1, wherein said identifying the the first function asset and the second function asset as being associated with the first game function comprises:
identifying, for each of the one or more function assets of the function store, an associated game function identifier; and
selecting the first function asset and the second function asset based at least in part, on a determination that the game function identifier of the first function asset and the second function asset corresponds to the first game function.

6. The method of claim 1, wherein the second function asset includes a scripting language.

7. A user computing system comprising:
one or more non-transitory, computer-readable storage mediums storing computer readable instructions, the computer readable instructions comprising at least application code for executing a game application, the application code comprising a function store that includes one or more function assets, the one or more function assets including at least a first function asset, wherein the first function asset is associated with a first game function, includes compiled machine code, and includes a first version identifier; and one or more processors configured to execute the computer readable instructions to perform operations comprising:
executing the game application using the application code, and
during runtime of the game application:
updating the function store to include a second function asset as one of the one or more function assets of the function store, wherein the second function asset is associated with the first game function, includes non-compiled code, and includes a second version identifier, wherein said updating occurs without recompiling the game application, and
executing the first game function, wherein said executing the first game function comprises:
identifying the first function asset and the second function asset as being associated with the first game function,
selecting the second function asset instead of the first function asset based, at least in part, on the first version identifier and the second version identifier, and
executing the first game function using the second function asset based, at least in part, on said selecting.

8. The user computing system of claim 7, wherein the one or more processors are configured to execute the computer readable instructions to perform operations further comprising:
prior to said updating the function store to include the second function asset, executing the first game function using the first function asset based, at least in part, on the first version identifier.

9. The user computing system of claim 7, wherein said selecting the second function asset instead of the first function asset comprises:
comparing the first version identifier with the second version identifier, and
identifying the second version identifier based, at least in part, on a determination that the second version identifier corresponds to a newer version identifier than does the first version identifier.

10. The user computing system of claim 7, wherein each of the first function asset and the second function asset includes a game function identifier associated with the first game function, wherein said identifying the first function asset and the second function asset as being associated with the first game function comprises:
identifying at least one of the first function asset or the second function asset from other function assets in the function store based, at least in part, on the game function identifier of the at least one of the first function asset or the second function asset.

11. The user computing system of claim 7, wherein said identifying the first function asset and the second function asset as being associated with the first game function comprises:
identifying, for each of the one or more function assets of the function store, an associated game function identifier; and
selecting the first function asset and the second function asset based, at least in part, on a determination that the game function identifier of the first function asset and the second function asset corresponds to the first game function.

12. The user computing system of claim 7, wherein the second function asset is code in a scripting language.

13. The user computing system of claim 7, wherein the one or more processors are configured to execute the computer readable instructions to perform operations further comprising:
updating the function store to include a third function asset as one of the one or more function assets of the function store, wherein the third function asset is associated with the first game function and includes a third version identifier,
selecting the third function asset instead of the first function asset and the second function asset based, at least in part, on the third version identifier, and
executing the first game function using the third function asset.

14. The user computing system of claim 13, wherein the third function asset is non-compiled code.

15. The user computing system of claim 13, wherein the third function code is compiled machine code.

16. A method for updating a game application on a client computing device comprising:
receiving an indication of a client computing device executing a game application, wherein the client computing device executes the game application using application code comprising a function store, wherein the function store comprises one or more function assets, the one or more function assets including at least a first function asset associated with a first game function, wherein the first function asset is compiled machine code and includes a first version identifier; and
during runtime of the game application, communicating, over a network, a data packet to the client computing device, wherein the data packet includes a second function asset that is associated with the first game function, wherein the second function asset is non-compiled code and includes a second version identifier, wherein during the runtime of the game application and without recompiling the game application, the client computing device updates the function store to include the second function asset as one of the one or more function assets of the function store, identifies the first function asset and the second function asset as being associated with the first game function, selects the second function asset instead of the first function asset based at least in part on the second version identifier, and executes the first game function using the second function asset.

17. The method of claim 16, wherein prior to said communicating the data packet to the client computing device, the client computing device executes the first game function using the first function asset.

18. The method of claim 16, the client computing device selects the second function asset instead of the first function asset by comparing the first version identifier with the second version identifier, and identifying the second version identifier based, at least in part, on a determination that the second version identifier corresponds to a newer version identifier than does the first version identifier.

19. The method of claim 16, wherein each of the first function asset and the second function asset includes a game function identifier associated with the first game function, wherein the client computing device identifies the first function asset and the second function asset as being associated with the first game function by identifying the first function asset and the second function asset from other function assets in the function store based, at least in part, on the game function identifier of the first function asset and the second function asset.

* * * * *